Nov. 17, 1925.
C. E. DANIEL
1,561,508
CANDLE HOLDER
Filed March 16, 1925
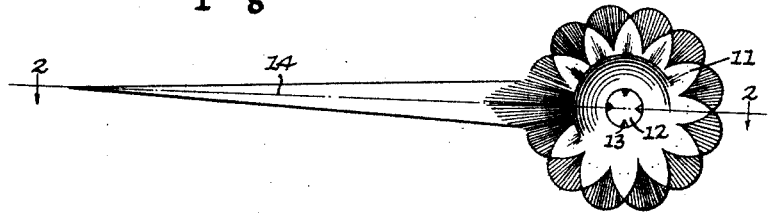
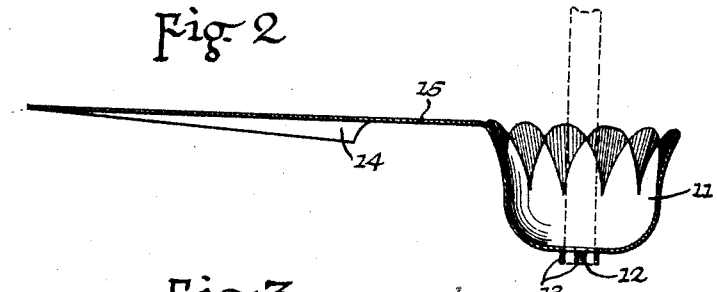
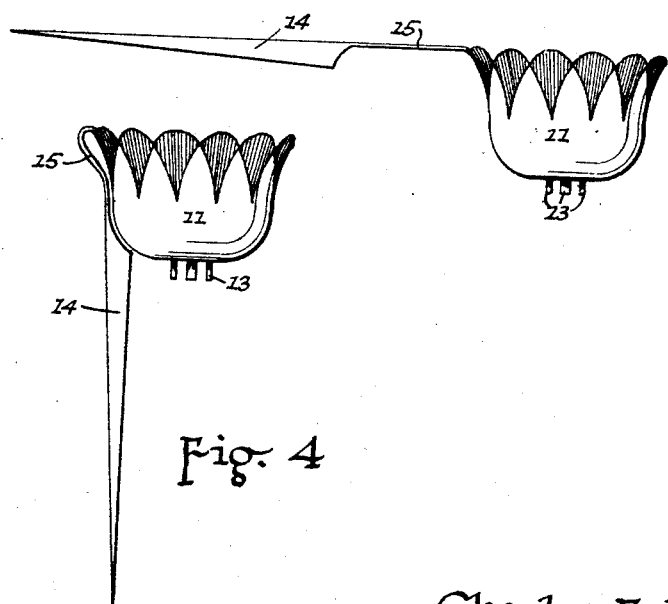
Charles E. Daniel
Inventor
by
Attorneys Patented Nov. 17, 1925.

1,561,508

UNITED STATES PATENT OFFICE.

CHARLES E. DANIEL, OF SANDUSKY, OHIO, ASSIGNOR TO THE AMERICAN CRAYON COMPANY, OF SANDUSKY, OHIO, A CORPORATION OF OHIO.

CANDLE HOLDER.

Application filed March 16, 1925. Serial No. 15,713.

*To all whom it may concern:*

Be it known that I, CHARLES E. DANIEL, a citizen of the United States of America, and a resident of Sandusky, in the county of Erie and State of Ohio, have invented certain new and useful Improvements in Candle Holders, of which the following is a full, clear, and exact description.

My invention relates to candle holders, particularly for supporting candles on articles such as cakes or the like, and the principal object of my invention is to provide a new and improved holder of this type. In the drawings accompanying this specification and forming a part thereof I have shown, for purposes of illustration, one form which my invention may assume. In these drawings:

Figure 1 is a top plan view of this illustrative embodiment of my invention,

Figure 2 is a section on the line 2—2 of Figure 1,

Figure 3 is a side elevation showing the supporting pin extending horizontally, while Figure 4 is a view similar to Figure 3 but showing the supporting pin extending vertically.

The device herein shown is formed from a single stamping and comprises a bowl 11 provided in its base with an aperture 12 arranged to permit the passage of the candle base therethrough and with projections 13 depending from the wall of the aperture 12 and arranged to additionally grip and steady the candle, and a pin 14 arranged to be inserted into the article, broadened to prevent turning of the pin in the article, arched to prevent bending of the pin transversely, and connected to the rim of the bowl 11 by a narrow flat intermediate section 15 arranged to permit the pin 14 to project in any direction from the bowl 11, such as horizontally as shown in Figure 3, or vertically as shown in Figure 4.

The bowl 11 is herein shown as formed to resemble a flower and, to carry out the representation of the flower, or other device, and to enhance the appearance of the holder, at least the bowl 11 is preferably ornamented, as by lithographing.

It will be apparent that the holder herein shown may be supported projecting in any direction from the article and in such manner that the holder is unlikely to turn or twist in the article, and that this holder is arranged to readily receive the drippings from the candle and to contain a large amount of these drippings before permitting the drippings to overflow onto and mar the article on which the holder is mounted or, when the holder projects horizontally from the article, the plate or table on which the article is resting. It will also be apparent that the holder herein shown and described may be produced at an extremely low cost and is relatively durable and lasting. Those skilled in the art will also find advantages in this particular holder other than those specifically pointed out and will realize that this particular embodiment of my invention may be variously changed and modified without sacrificing the advantages of my invention or departing from the spirit thereof. It will therefore be understood that this disclosure is illustrative only and that my invention is not limited thereto.

I claim:

1. A candle holder comprising a bowl formed to retain drippings, arranged to support a candle in its base, and provided at its rim with a unitary extension arranged to be inserted into a supporting body to support from said body both said holder and the candle carried thereby.

2. A candle holder comprising a bowl formed to retain drippings and provided at the center of its base with an annular series of axially extending prongs struck from said bowl, leaving in said bowl an aperture for the passage of a candle therethrough, and arranged to support such candle.

3. A candle holder comprising a bowl formed to retain drippings, provided at the center of its base with an annular series of axially extending prongs struck from said bowl and leaving in said bowl an aperture for the passage of a candle therethrough and themselves arranged to support such candle, and provided at its rim with a unitary extension arranged to be inserted into a supporting body to support from said body both said holder and the candle carried thereby.

4. A candle holder comprising a bowl formed to retain drippings, arranged to support a candle in its base, and provided at its rim with a unitary extension arranged to be inserted into a supporting body to support from said body both said holder and the candle carried thereby, said support being relatively stiff except adjacent said bowl, to thus prevent deformation upon insertion into the supporting body and at the same time permit disposal of said bowl at any desired angle.

5. A candle holder comprising a bowl formed to retain drippings, provided at the center of its base with an annular series of axially extending prongs struck from said bowl and leaving in said bowl an aperture for the passage of a candle therethrough and themselves arranged to support such candle, and provided at its rim with a unitary extension arranged to be inserted into a supporting body to support from said body both said holder and the candle carried thereby, said support being relatively stiff except adjacent said bowl, to thus prevent deformation upon insertion into the supporting body and at the same time permit disposal of said bowl at any desired angle.

In testimony whereof I hereunto affix my signature.

CHARLES E. DANIEL.